Feb. 20, 1962    A. E. BRATT ET AL    3,022,125
CAGE FOR DOUBLE ROW SPHERICAL ROLLER BEARINGS
Filed Jan. 13, 1960    2 Sheets-Sheet 1

INVENTORS:
AXEL ERLAND BRATT
KARL GUSTAV EINAR DERMAN
BY Howson & Howson
ATTYS.

Feb. 20, 1962 A. E. BRATT ET AL 3,022,125
CAGE FOR DOUBLE ROW SPHERICAL ROLLER BEARINGS
Filed Jan. 13, 1960 2 Sheets-Sheet 2
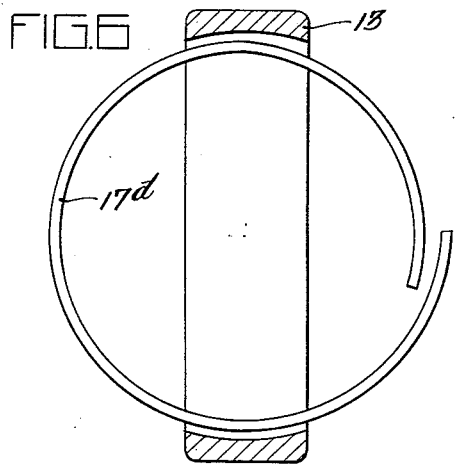
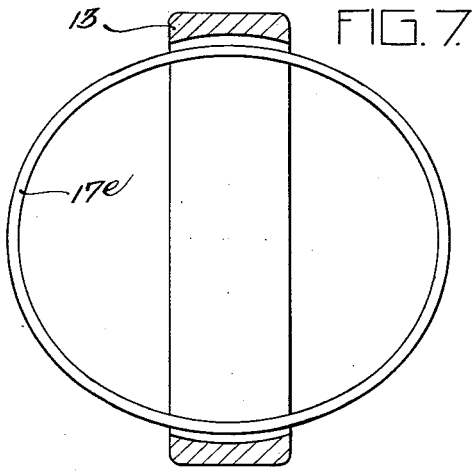
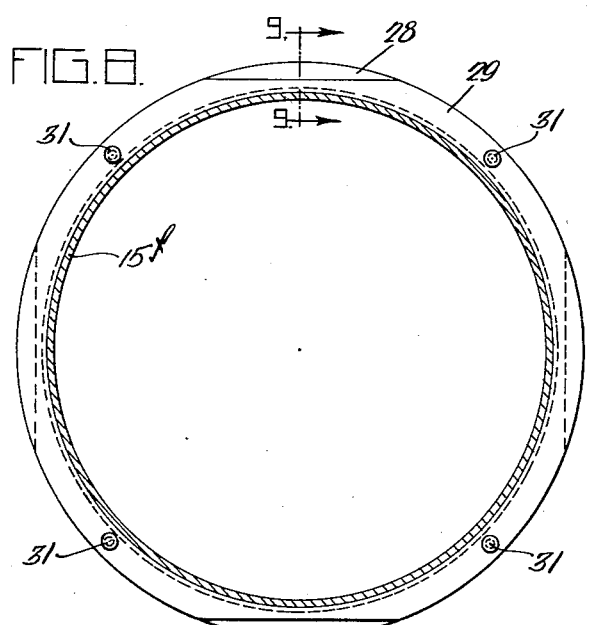
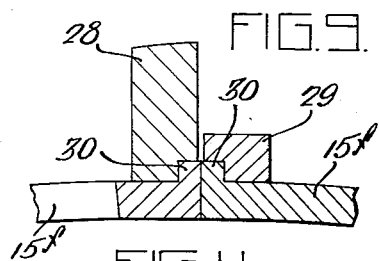
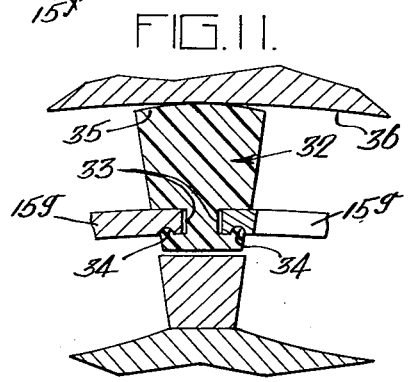
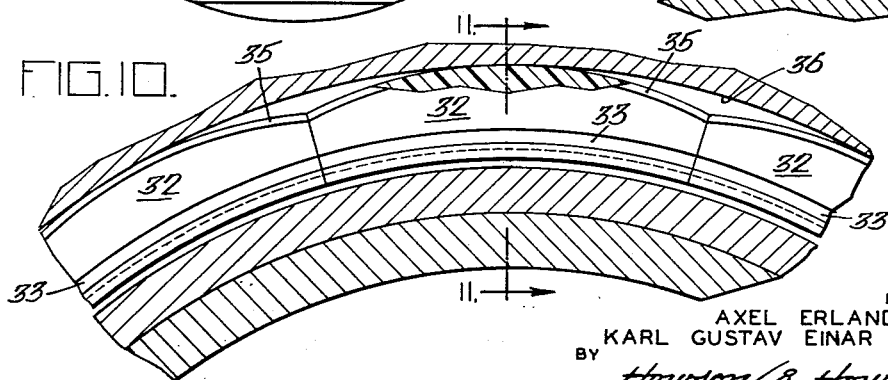
INVENTORS.
AXEL ERLAND BRATT
KARL GUSTAV EINAR DERMAN
BY Howson & Howson
ATTYS.

United States Patent Office 3,022,125
Patented Feb. 20, 1962

3,022,125
CAGE FOR DOUBLE ROW SPHERICAL ROLLER BEARINGS
Axel Erland Bratt, Goteborg, and Karl Gustav Einar Derman, Savedalen, Sweden, assignors to Aktiebolaget Svenska Kullagerfabriken, Goteborg, Sweden, a corporation of Sweden
Filed Jan. 13, 1960, Ser. No. 2,269
Claims priority, application Sweden Feb. 6, 1959
8 Claims. (Cl. 308—213)

The present invention relates to a cage for double row spherical roller bearings having barrel-shaped rollers and an outer spherical raceway common to both rows of rollers. The cage according to the invention comprises a pair of substantially similar cage members, one for each row of rollers, having closed roller pockets of so-called window type, and is characterized mainly by one or more members which interconnect the cage members and which slide on the outer raceway and thereby center the cage.

In previously proposed cages for roller bearings of the above-mentioned type there has been a separate cage member for each row of rollers, and these have usually been centered on the inner race ring. In bearing applications in which the bearing and its cage are subjected to heavy centrifugal forces, for instance in crank bearings, the demands on the lubrication of the engaging surfaces are especially great. It has therefore been proposed to provide each cage member with a flange which slides against the outer raceway, i.e. that portion of the bearing toward which the lubricant tends to flow due to centrifugal forces. A bearing of this kind is, however, difficult to manufacture. In certain cases it is also undesirable that the two members forming the cage are free to move independently of each other. This is the case particularly when the bearing is subjected mainly to thrust forces. When one of the rows of rollers is running without load there will be no driving force on its cage member which will thus have a tendency to slow down or stop and will be caused to accelerate again when it is again subjected to load. Repeated acceleration and retardation of this kind is injurious to the bearing. Unidirectional thrust forces may also result in that one of the cage members and its rollers may lag and thus cause wear in the bearing.

The purpose of the present invention is thus to provide a device which not only interconnects the two members of the cage whereby the member in the loaded zone of the bearing drives the unloaded member, but also centers the cage in the outer race ring where lubricating conditions are most favorable. One advantage of the invention is that standard cages centered on the inner race ring can be altered to center on the outer race ring by a simple machining operation. The device according to the invention may be made in many different ways. Several forms of the invention are shown on the accompanying drawings and described below by way of example.

FIGS. 6 and 7 show other embodiments of the annular member and the manner of assembly thereof in the outer ring;

FIG. 8 is a side elevational view of another embodiment of annular members;

FIG. 9 is an enlarged fragmentary sectional view on line 9—9 of FIG. 8;

FIG. 10 is a fragmentary vertical sectional view of another embodiment of annular member formed by a plurality of arcuate segments;

FIG. 11 is a sectional view taken on line 11—11 of FIG. 10.

Figure 1:
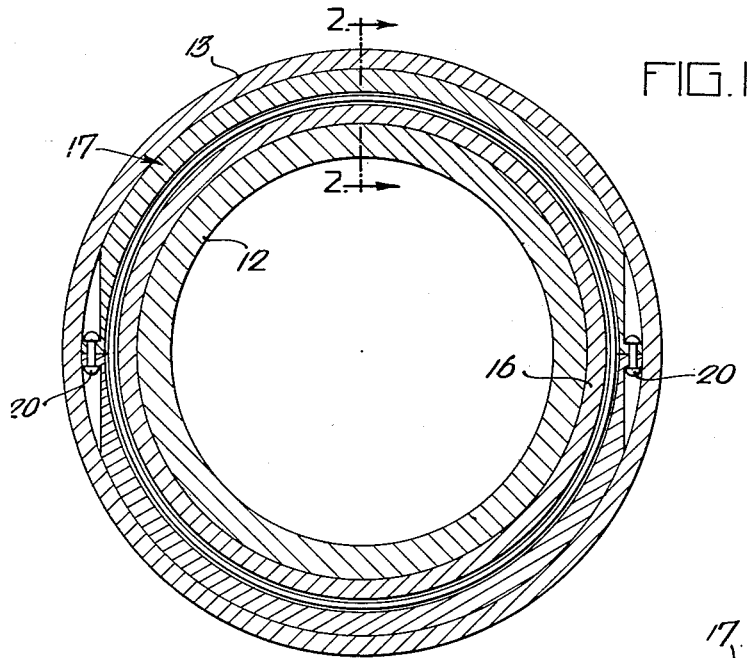
FIG. 1 is a section in a plane perpendicular to the axis of a two-row spherical roller bearing with the roller elements omitted.
Figure 2:
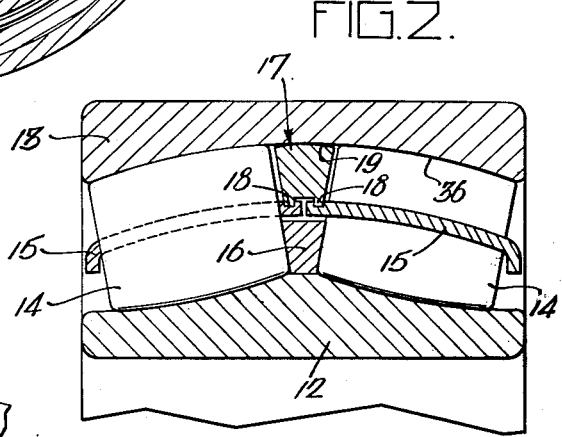
FIG. 2 is an enlarged sectional view taken on line 2—2 of FIG. 1.

In FIGS. 1 and 2 the numerals 12 and 13 designate the inner and outer races, respectively, of a double-row spherical roller bearing having an outer spherical raceway 36 common to both rows of rollers. The rollers 14 are separated by a cage having closed pockets, a so-called window-type cage comprising two members 15, one for each row of rollers. The rollers are guided partly by the cage and partly by a guide ring 16 mounted on the inner race ring. The members of the cage are held together by a split ring 17 having a pair of internal ridges 18 which fit into corresponding external grooves in the cage members 15. The halves of the ring 17, after being introduced into the outer race ring, are united by means of a pair of rivets 20, screws or the like. The outer surface 19 of the ring 17 is preferably spherical and its radius is slightly less than that of the outer raceway, so that there will always be a certain amount of sliding play between the ring 17 and the outer raceway 36.

Figure 3:
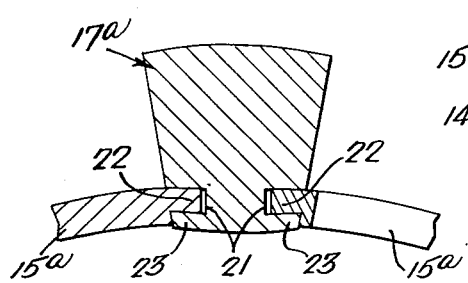
FIG. 3 is an enlarged fragmentary sectional view of an annular member for interlocking the cage elements.
Figure 4:
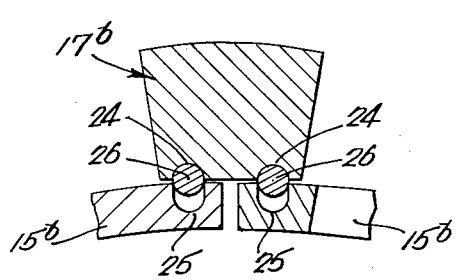
FIGS. 4 and 5 are views similar to FIG. 3, showing another embodiment of the annular member and the manner of connecting the cages thereto.
Figure 5:
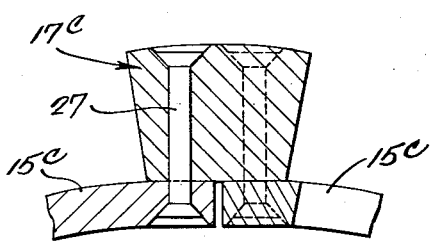

The ring 17 shown in FIGS. 1 and 2 can be connected to the cage members in different ways. FIGS. 3, 4 and 5 show alternative forms thereof. In the form shown in FIG. 3, the ring 17$^a$ is provided with a pair of axially open grooves 21. When flanges 22 on the cage members 15$^a$ have been introduced into the grooves 21, the portions 23 of the ring are expanded outwards to provide a dovetail joint between the ring 17$^a$ and the cage members 15$^a$. The ring 17$^a$ is preferably made in a single piece, and may be flattened at two external, diametrically opposed points, which make it possible to introduce it into the outer race ring of the bearing. The relative positions and shape of these flattened portions is apparent from FIGS. 8 and 9, and the portion of the specification relative thereto. The ring 17$^b$ shown in FIG. 4 is provided with grooves 24, there being corresponding grooves 25 in the cage members 15$^b$. Split rings 26 are inserted in the respective grooves to hold the parts together.

In the form of the invention shown in FIG. 5, the ring 17$^c$ is connected to the halves of the cage by rivets 27. FIGS. 6 and 7 show two different forms of the rings 17$^d$ and 17$^e$ of which the one according to FIG. 6 is split. The ring 17$^d$ is compressed to make the ends thus provided overlap, thereby enabling the ring to be introduced into the outer race ring. The ring 17$^e$ according to FIG. 7 can be elastically deformed to an oval shape, so that it can be inserted into the outer race ring. The ring 17$^e$ itself may be yielding, or it may be made thinner locally to enable it to be more easily deformed.

FIGS. 8 and 9 illustrate a connecting member comprising a pair of rings 28 and 29. These rings are flattened at two diametrically opposed locations, i.e., two segments of the rings have been removed to enable them to be passed separately into the outer ring. They are then rotated relative to each other, so that the flattened portions of each ring are displaced 90° relative to those of the other ring as shown in FIG. 8. This angle is, of course, optional, but it should be greater than that corresponding to the arc of the segment. Thus there will be contact between the outer raceway 36 and the outer surface of the ring around the whole circumference of the composite ring. The cage members 15$^f$ are provided with circular ridges 30, and the rings with grooves corresponding thereto. By connecting the two rings 28 and 29 with rivets 31, it will thus be possible to unite the two halves 15$^f$.

Finally, FIGS. 10 and 11 show a form of the invention in which the connecting members comprise a number of ring-sector shaped plastic members 32 arranged in a ring, each being provided with two grooves 33 having at their openings circular ridges 34 which snap into grooves in the cage members 15ᵃ. The outer surfaces 35 of the members 32 have a radius less than that of the spherical surface of the outer raceway 36 as shown in FIG. 10, whereby lubrication between these surfaces will be facilitated.

While particular embodiments of the present invention have been illustrated and described herein, it is not intended to limit the invention to such disclosure, and changes and modifications may be incorporated and embodied therein within the scope of the following claims.

We claim:

1. In a roller bearing having concentrically disposed inner and outer races, and at least two axially spaced rows of roller elements in the annular space between said races, a cage for each row of roller elements having a pocket for each roller element thereof, and a connecting member intermediate said cages and interlockingly engaged with the inner edges thereof to connect the cages for simultaneous movement and sliding against the outer race to thereby center the cages relative thereto.

2. Apparatus according to claim 1, wherein the outer race has a concave spherical raceway formed on the inner peripheral surface thereof, and the connecting member is in the form of a ring and has a spherical outer surface with a radius smaller than the radius of curvature of the raceway in said outer race to thereby provide sliding play between said ring and said outer race.

3. Apparatus according to claim 2, wherein the ring is formed by two arcuate segments connected at their terminal ends.

4. Apparatus according to claim 2, wherein the ring is a split ring to facilitate positioning thereof in said outer race.

5. Apparatus according to claim 1, wherein the connecting member is formed by a plurality of arcuate segments.

6. Apparatus according to claim 2 including circumferential channels formed in the ring in the annular sides thereof to receive the cages, and means to secure the cages along their inner edges.

7. Apparatus according to claim 6 including a circumferential bead formed in the channel and a groove adjacent the edge of the cage to engage over said bead and retain the cage in the channel.

8. In a roller bearing having concentrically disposed inner and outer races, and at least two axially spaced rows of roller elements in the annular space between said races, a spacer on the inner ring separating the rows of roller elements, a cage for each of the rows of roller elements having pockets for each roller element thereof, flanges formed on the edges of adjacent cages, pairs of co-acting rings securing the cages therebetween at the flange portions, each of said pairs connected together, one ring of each of the pairs having diametrically opposed flattened surfaces circumferentially removed from the flattened surfaces on the other ring of said pairs.

References Cited in the file of this patent

UNITED STATES PATENTS

| 1,846,836 | Buckwalter | Feb. 23, 1932 |
| 1,914,548 | Wingquist | June 20, 1933 |

FOREIGN PATENTS

| 772,478 | France | Aug. 18, 1934 |
| 661,256 | Great Britain | Nov. 21, 1951 |
| 936,307 | Germany | Dec. 7, 1955 |
| 743,727 | Great Britain | Jan. 25, 1956 |